(12) United States Patent
Stuber et al.

(10) Patent No.: US 10,486,358 B2
(45) Date of Patent: Nov. 26, 2019

(54) BIAXIAL FORMING PROCESS FOR THICK-WALLED ACRYLIC SHEET

(75) Inventors: Wolfgang Stuber, Udenheim (DE);
Christian Eckhardt, Darmstadt (DE);
Helmut Hilsmann, Veretz (FR)

(73) Assignee: Roehm GmbH, Darmstadt (DE)

( * ) Notice: Subject to any disclaimer, the term of this patent is extended or adjusted under 35 U.S.C. 154(b) by 1090 days.

(21) Appl. No.: 14/131,597

(22) PCT Filed: Jul. 19, 2012

(86) PCT No.: PCT/EP2012/064136
§ 371 (c)(1),
(2), (4) Date: Jan. 8, 2014

(87) PCT Pub. No.: WO2013/023867
PCT Pub. Date: Feb. 21, 2013

(65) Prior Publication Data
US 2014/0162025 A1    Jun. 12, 2014

(30) Foreign Application Priority Data

Aug. 17, 2011  (EP) .................................... 11006719
Nov. 30, 2011  (DE) ........................ 10 2011 087 446

(51) Int. Cl.
*B29C 51/02* (2006.01)
*B29C 51/08* (2006.01)
*B29K 33/04* (2006.01)
*B29K 33/00* (2006.01)

(52) U.S. Cl.
CPC ............ *B29C 51/02* (2013.01); *B29C 51/082* (2013.01); *B29C 2791/006* (2013.01); *B29K 2033/04* (2013.01); *B29K 2033/12* (2013.01); *Y10T 428/24479* (2015.01)

(58) Field of Classification Search
CPC ....................................................... B29C 51/02
See application file for complete search history.

(56) References Cited

U.S. PATENT DOCUMENTS

| | | | |
|---|---|---|---|
| 4,348,060 A | 9/1982 | Lewis, Jr. | |
| 6,221,300 B1 | 4/2001 | Sakai | |
| 2008/0149016 A1 | 6/2008 | Moorhouse | |
| 2009/0229507 A1 | 9/2009 | Moorhouse | |
| 2013/0265776 A1* | 10/2013 | Zollner | B29C 45/16 362/311.02 |

FOREIGN PATENT DOCUMENTS

| | | |
|---|---|---|
| DE | 469 929 | 12/1928 |
| DE | 103 59 563 | 7/2005 |
| FR | 1 253 044 | 2/1961 |

OTHER PUBLICATIONS

International Search Report dated Nov. 9, 2012 in PCT/EP12/064136 Filed Jul. 19, 2012.

* cited by examiner

*Primary Examiner* — Larry W Thrower
(74) *Attorney, Agent, or Firm* — Oblon, McClelland, Maier & Neustadt, L.L.P.

(57) ABSTRACT

The present invention relates to a novel biaxial forming process for a preform made of a polymer material which comprises polymethyl methacrylate, to an apparatus for carrying out the process, and also to novel components obtained from a biaxial forming process and their use.

12 Claims, 7 Drawing Sheets

Figure 5: Thickness-measurement points for hemispherical windows

Figure 6: Outline sketch of thickness-measurement points

BIAXIAL FORMING PROCESS FOR THICK-WALLED ACRYLIC SHEET

The present invention relates to a novel biaxial forming process for a preform made of a polymer material, to an apparatus for carrying out the process, and also to novel, thick-walled components obtained from a biaxial forming process and their use.

Thick-walled components made of acrylic sheet in the form of, for example, spherical-segment windows or hemispherical windows are currently mainly used as glazing for immersible boats for research purposes and for touristic purposes. The geometry of these panes requires constant thickness and a material which is of high optical quality and which moreover must comply with the stringent demands that the appropriate regulatory systems place upon the materials. The definitive process used to produce component preforms of the said quality is high-pressure polymerization. These component preforms are then used to produce the final window elements by milling, grinding and polishing. A problematic feature of the said process is that any dirt, bubbles or shrinkage cavities introduced during the preform production process are not detectable in the finished components until the end of the window-manufacturing process. However, they are a "knock-out" criterion for acceptance and use, and the result is therefore large amounts of rejected product, long lead times and/or unreliability of supply and duplication of operations.

Forming processes are likewise known in the prior art. These in essence involve biaxial stretching processes, a feature of which is that a slab of acrylic sheet is clamped at the edges and stretched in such a way that the residual thickness at the apex is only about 30% of the original thickness of the material. This process is used to produce, for example, domelights. The said biaxial stretching processes cannot therefore be used for the products according to the invention, since a final product of a thickness of 100 mm would require manufacture of a preform of a thickness of at least 300 mm, and this would be too expensive and time-consuming. The said processes are therefore excluded for component thicknesses of 30 mm and more.

There is therefore much demand for efficient processes for producing biaxially curved components with high wall thicknesses which comply with stringent safety requirements and also with stringent optical requirements.

It was therefore an object of the present invention to provide a process which does not have the disadvantages of the prior art or has these only to a reduced extent. The intention is moreover to provide biaxially curved components with high wall thicknesses which comply with stringent safety requirements and stringent optical requirements and which can be produced more economically than products of the prior art.

A specific object consisted in providing a process which leads to less scrap and can therefore be carried out more economically. In particular, it is intended that the optical quality of the component obtained from the forming process be detectable and controllable at the earliest possible juncture during the production process.

In another specific object, the process according to the invention is intended to lead to maximum strength qualities in the final product, and to permit production of products with maximum uniformity of wall thicknesses.

A specific object consisted in developing a process in which the ratio of thickness of the preform to thickness of the component obtained from the forming process is minimized.

Other objects not explicitly mentioned are apparent from the entirety of the description, examples, claims and figures below.

Surprisingly, the inventors have found that by means of a biaxial forming process according to claim 1 or any of the claims dependent thereon it is possible to produce thick-walled components, e.g. hollow shapes and spherical-segment windows, which comply with very stringent safety requirements and very stringent optical requirements. The process according to the invention represents a substantial technical advance in relation to the prior-art forming processes described above, since only very little stretching takes place and the mechanical properties of the preform are therefore substantially retained.

An advantage of the process according to the invention in comparison with the abovementioned high-pressure polymerization process is that it starts from preforms that have been tested, i.e. the optical and mechanical quality of the final component can be ensured prior to the forming process, and inclusions, such as dirt and bubbles, can be excluded at this early juncture. Contamination due to the mould can be ignored, since this merely adheres to the surface of the component obtained from the forming process and can easily be removed by grinding and polishing. The process according to the invention permits quality control at a very early juncture and can thus minimize scrap and considerably improve lead time, and also reliability of supply.

Because the wall thickness of the preform is the same as or only slightly thicker than that of the component obtained from the forming process, it is moreover possible to save material during operations and to reduce raw-material costs.

The design of the apparatus according to the invention renders this versatile, and it is possible to produce not only symmetrical but also asymmetrical components. The thickness and shape of the components can be varied rapidly and easily.

The present invention therefore provides a process according to claim 1, an apparatus according to claim 8, thick-walled non-planar components according to claim 11, and also their use. The dependent claims protect preferred embodiments.

Figure 1:
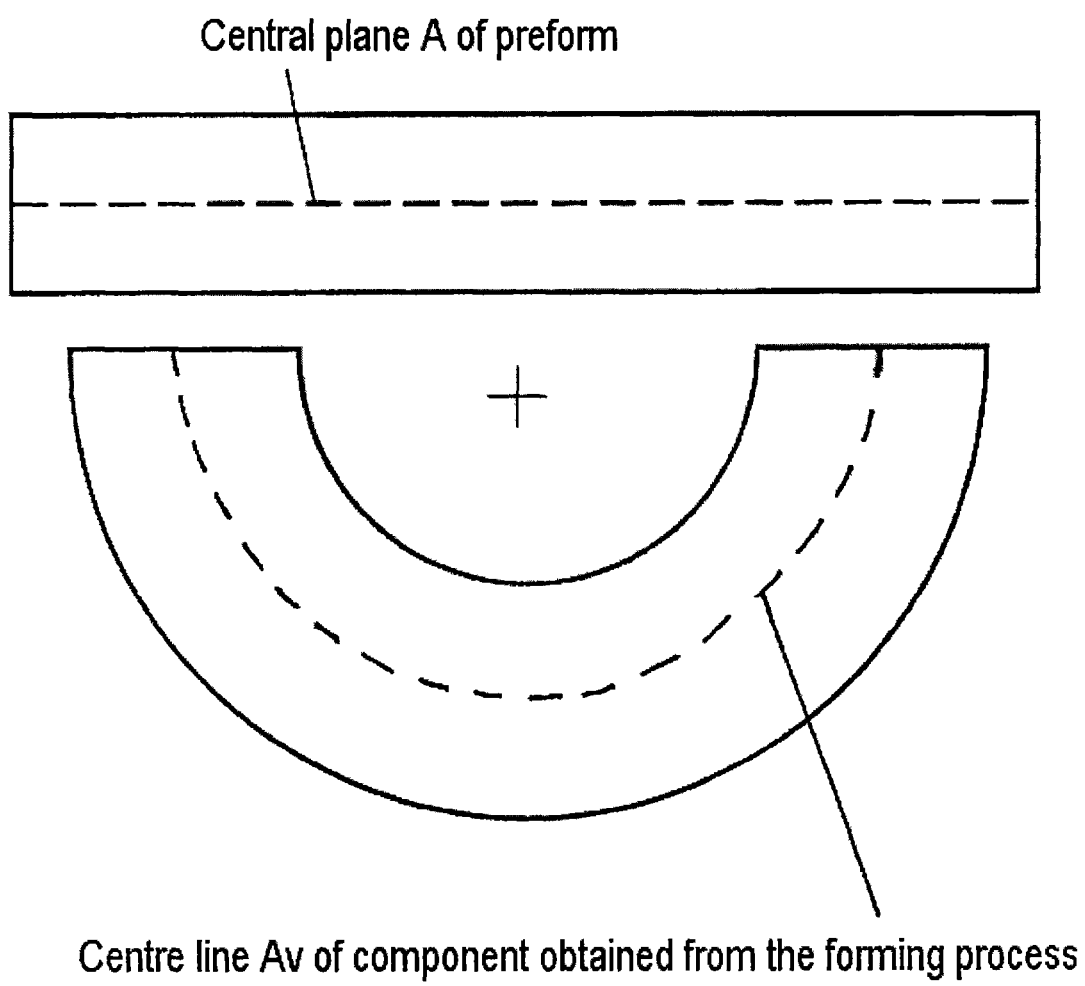
FIG. 1 is a schematic illustration of an embodiment of producing a biaxially curved component from a preform.

A feature of the process according to the invention for producing biaxially curved components from preforms which preferably comprise polymethyl methacrylate is that it comprises the following steps:

a) producing a preform of thickness from 30 to 400 mm from a, preferably polymethyl-methacrylate-containing, polymer material, where the area A in the central plane of the preform is equal to the area Av in the central plane of the component obtained from the forming process, with a variance of ±40% —see FIG. 1 for the definition of "A" and "Av", b) introducing the preform into the apparatus for the forming process in such a way that it is freely moveable at its edges even during the forming process, c) heating the preform to a temperature of from 120 to 170° C., d) using a male mould to carry out a forming process on the preform.

In step a), a preform is produced from a polymer material which preferably comprises polymethyl methacrylate. Any of the processes known to the person skilled in the art can be used for this purpose. However, it is preferable that the preform is produced by the casting process or continuous cast process. A preform sheet is very generally used.

In one preferred embodiment, the preform is composed of a single-layer slab. This embodiment is preferably selected when very stringent mechanical requirements are placed upon the component obtained from the forming process.

In an alternative, preferred embodiment of the present invention it is also possible to use preforms which are composed of a plurality of layers bonded to one another. These are preferably produced by lamination or coextrusion. This embodiment is more likely to be selected when less stringent mechanical requirements are placed upon the component obtained from the forming process. However, this embodiment has the advantage that specific effects and mechanical properties can be achieved. It would thus be possible by way of example to use, as preform, a slab made of two differently coloured layers, thus permitting achievement of specific optical effects in the final component. The thickness of the respective layers in the laminate or coextrudate here is freely selectable.

For the process according to the invention it is important that the area A in the central plane of the preform is equal to the area Av in the central plane of the component obtained from the forming process with a variance of ±40%, preferably ±30% and particularly preferably ±20%. In other words, the area A of the preform should be as nearly as possible equal to the area Av of the material obtained from the forming process. The shape of preform should have been adapted to be appropriate to the subsequent shape of the component from the forming process. It is particularly preferable that the distance of any point at the edge of the central plane A from the centre of A differs by at most ±40%, preferably ±30% and particularly preferably ±20% from the distance of the respectively identical point at the edge of the central plane Av from the centre of Av. This means in other words that by way of example when a hemispherical component is produced the shape of the preform pane used is as close as possible to circular. The geometric parameters for the preform are important in minimizing the energy and forces that have to be applied in the forming process. When appropriate adaptation of the shape of the preform is maximized, the extent of stretching and compression in the part obtained from the forming process is minimized, and the resultant forming process then particularly conserves material and saves material and energy.

One particular advantage of the process according to the invention is that only very little overstretching occurs and it is therefore possible to use comparatively thin preforms. Preferred embodiments therefore use preforms with a thickness at their thinnest point, as a ratio to the thickness of the components obtained from the forming process at their thinnest point, of from 1.0 to 2.0, particularly preferably from 1.05 to 1.5 and very particularly preferably from 1.1 to 1.2.

The process according to the invention is carried out with preforms of thickness from 30 to 400 mm, preferably from 30 to 300 mm, particularly preferably from 30 to 250 mm, very particularly preferably from 50 to 200 mm, specifically preferably from 50 to 180 mm and with particular preference from 60 to 160 mm, thus permitting production of components obtained from the forming process with greatly variable thickness.

The polymer material used must comply with the mechanical and optical requirements placed upon the final component. In particular in critical application sectors, it must comply with the relevant technical regulatory systems, in order that the finished pane also complies with the said requirements. One of these systems of standards is the respective current issue of ASME PVHO (American Standard of Mechanical Engineering). This provides a detailed description of the minimum requirements placed upon the properties of the material, and the starting material itself must have these properties. Compliance with the requirements relating to optical purity (no bubbles, distortion, dirt inclusions, etc.) is also required. Polymethyl methacrylate-containing polymer materials in particular comply with the abovementioned conditions, and 0Z00 PLEXIGLAS®GS from Evonik Röhm GmbH may be mentioned by way of example, as certified by Germanischer Lloyd.

Figure 2:
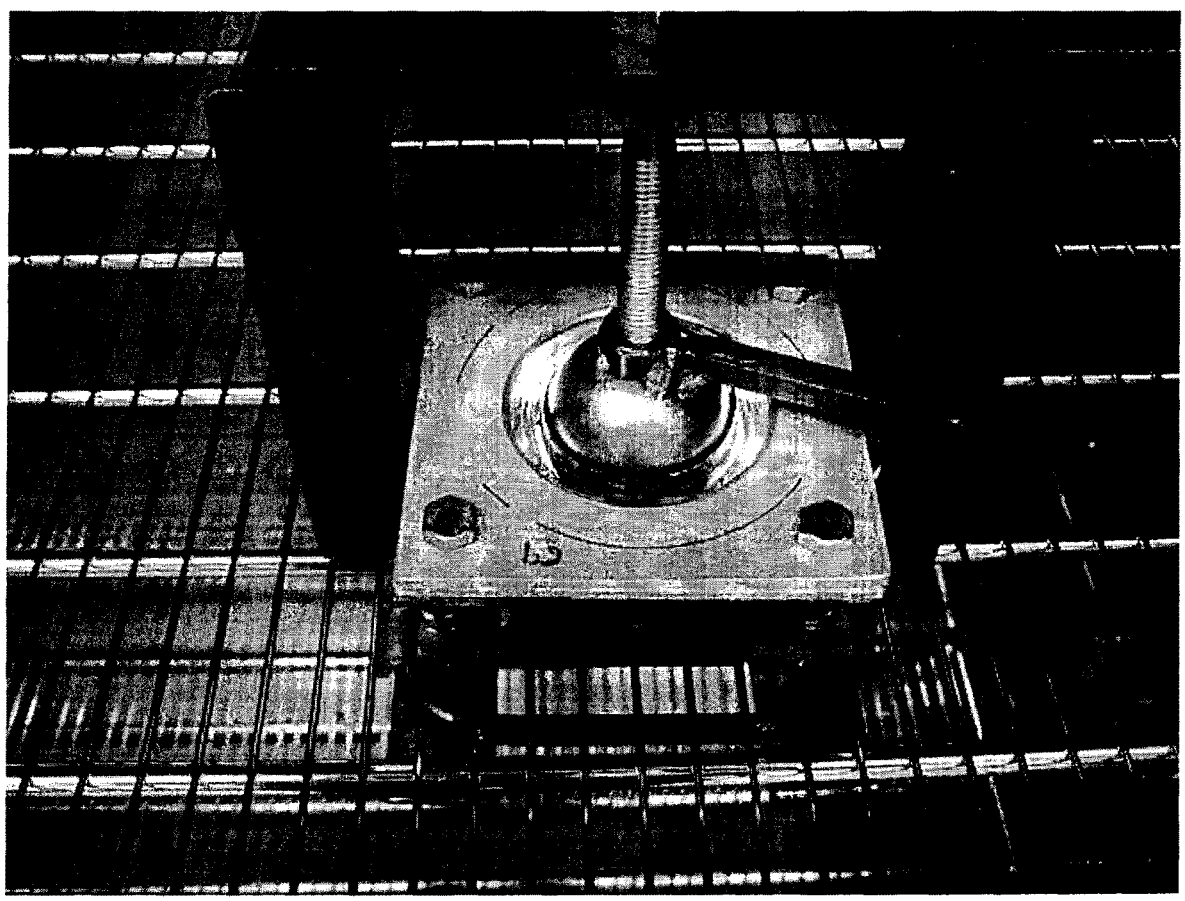
FIG. 2 is a photograph of an embodiment of an apparatus with preform subjected to a forming process.

Another essential element of the present invention is that in step b) the preform is introduced into the apparatus for the forming process in such a way that it is freely moveable at its edges during the forming process. In other words, the preform is not subject either to fixed clamping or to any similar type of fixing at the edge. It is preferable that the preform lies on a female mould in the apparatus for the forming process. The inventors have found that this method allows the sheet (the preform) to continue to slide or flow without hindrance during the forming process and, during the course of the process, allows spontaneous relaxation of any stresses introduced. This is a substantial difference from prior-art forming processes. FIG. 2 depicts an apparatus according to the invention with preform subjected to a forming process. The circular edge marking on the female mould corresponds to the original periphery of the preform. A hemispherical component has been produced in FIG. 2 by using a circular preform. FIG. 2 shows that the movement of the preform has been such as to bring its edge flush with the female mould after the forming process. Fixed edges would have remained at the line marking, and the material would have become stretched and therefore weakened.

If the preform alone is subjected to the forming process according to the invention, this means that a specific female mould must be produced for each preform thickness and each tooling geometry.

In order to avoid this, one specific embodiment of the present invention comprises a process in which one or more sacrificial sheet(s) is/are placed on the preform, i.e. on the male-mould side and/or below the preform, i.e. on the female-mould side. It is preferable that there is no fixed bonding between the said panels and the preform, i.e. to form a laminate, but there can also be fixed bonding, partially or across the entire surface. In this embodiment, the preform and all of the sacrificial sheets are together subjected to a forming process. All of the sacrificial sheets can be recycled. A great advantage of this embodiment is that one apparatus, i.e. one female mould, can replicate many different geometries and component thicknesses, and that there is no need to produce new tooling on every occasion. This leads to a significant cost reduction specifically in the case of PMMA, which has very good recyclability. If single-product plastics are used as sacrificial sheets, recyclability is further improved.

If the sacrificial sheets are placed on the preform, the area of these that faces towards the preform is preferably at most 5% greater or smaller than that of the preform. It is particularly preferable that the area is identical. In the case of sacrificial sheets which are circular or approximately circular, the diameter of these is preferably up to 5% greater or smaller than that of the preform. It is particularly preferable that the diameter of the sacrificial sheets is the same as that of the preform. The shape of preform and sacrificial sheet here is preferably the same.

If a sacrificial sheet placed under the preform is used, the area of this that faces towards the preform is preferably at most 5% greater or smaller than that of the preform. It is particularly preferable that the area is identical. In the case of sacrificial sheets which are circular or approximately circular, the diameter of these is preferably up to 5% greater or smaller than that of the preform. It is particularly preferable that the diameter of the sacrificial sheets is the same as that of the preform. The shape of preform and sacrificial sheet here is preferably the same.

However, if sacrificial sheets are placed under the preform, the shape can, however, also have cut-outs in the region of the male mould. In this preferred embodiment, the cut-out region can amount to up to 95% of the preform surface. In this case, it is preferable that the sacrificial-panel area facing towards the preform is equal to the area of the preform minus the area of the cut-out of the sacrificial sheet, with a variance of at most 5%. It is particularly preferable that the area of the sacrificial sheet is equal to the area of the preform minus the area of the cut-out region.

This embodiment can in principle use any desired number of sacrificial sheets. However, an effective method uses only one sacrificial sheet on or under the preform, or uses one sacrificial sheet on the preform and one sacrificial sheet under the preform.

Another alternative embodiment for reducing tooling costs consists in using flexible female moulds and/or male moulds, i.e. female moulds or male moulds of which the diameter and shape can be altered.

In step c) of the process according to the invention, the preform is heated to a temperature of from 120 to 170° C., preferably from 120 to 150° C. Any desired method can in principle be used for this purpose. By way of example, the preform can be heated in an external apparatus, e.g. an oven, and then introduced into the apparatus according to the invention. In this case, step c) would take place prior to step b).

However, as an alternative, the preform can also be heated in the actual apparatus for the forming process. To this end, the apparatus can either comprise appropriate heating equipment, or the entire apparatus for the forming process can have a surrounding temperature-controllable housing, preferably an oven.

During the forming process, preferably during the entire forming process, the process temperature of the preform is kept constant with a variance from the initial temperature of the preform which is preferably ±5%, particularly preferably ±4% and very particularly preferably ±2%. In order to provide reliable process temperatures, the entire forming process can take place in a temperature-controllable housing, e.g. an oven. Another suitable procedure is the use of temperature-controlled tooling. Different temperature-control of the moulds and contact areas is likewise possible, in order to establish specific conditions for the forming process.

It is particularly preferable that, prior to the forming process, the temperature of the entire preform is kept as constant as possible at the temperature for the forming process, and that the temperature in the central plane of the preform is kept constant during the entire forming process with a variance of up to ±5%. It is preferable here that the temperature in the central plane of the preform should differ by at most from 15 to 25° C., particularly preferably by at most from 5 to 15° C., from the temperature at the exterior surface. It is preferable to ensure that, as far as possible, no temperate variations occur through the forming process. In an example of a method for monitoring and regulating the process conditions, appropriate temperature measurements are carried out on a reference slab of identical thickness, located in the same, or a comparable, thermal housing.

The forming process generally proceeds very slowly without interruption or else in sub-steps, using small steps in the forming process. Holding phases permit relaxation of the material, which can then continue to flow. Overstretching is thus reduced to an absolute minimum. The selected temperature range, the speed of the forming process, or else the holding phases, can be used to achieve a significant reduction in the forces dependent thereon.

If the process according to the invention is carried out without holding phases, the speed of the forming process is preferably from 0.2 to 2 mm/sec, particularly preferably from 0.5 to 1.5 mm/sec and very particularly preferably from 0.5 to 1 mm/sec. If, in contrast, the process according to the invention is carried out with one or more holding phases, the speed of the forming process is preferably from 0.2 to 20 mm/sec, particularly preferably from 0.5 to 10 mm/sec and very particularly preferably from 0.5 to 5 mm/sec. It is particularly preferable to carry out the forming process without holding phases.

The force required for the forming process rises with the speed of the forming process. Within the entire process (heating, forming process and cooling), the actual time for the forming process represents by far the shortest section. A very moderate speed should therefore be selected for the forming process.

The actual forming process for the preform takes place in step d) in the process according to the invention, by means of a male mould. It has proven to be particularly advantageous here for the conduct of the process and for the quality of the product if the preform is moved from below against a fixedly mounted male mould, or a male mould is forced from above into a preform, in such a way that the component obtained from the forming process can be produced on the upper side of the female mould. The female mould used can preferably comprise an open or closed countermould.

The forming process can be assisted, and the force on the male mould can be reduced, if an aid to the forming process, e.g. a lubricant, is applied to the female mould and/or to the male mould, and/or an apparatus with reduced-pressure equipment, preferably a vacuum bag below the female mould, is used. By this means it is possible to reduce the stresses or shear forces arising in the region of passage through the female mould, with a resultant favourable effect on the mechanical properties of the component obtained from the forming process.

The versatility of the process according to the invention can be increased by using an apparatus in which the shaping parts, in particular male mould and/or female mould, have been designed moveably, in such a way that their position can be altered during the forming process. It is thus also possible to produce asymmetrical hollow shapes, for example parts of water slides.

The component obtained from the forming process generally remains in the mould after the forming process, and is cooled with the same before being removed. In particular when aperture angles are greater than 150° there is a risk that, during cooling of the component obtained from the forming process, it shrinks onto the male mould. In such cases, it is preferable to prevent this by retracting the moulding male mould before the component shrinks onto the same. Alternative, likewise preferred, possibilities for preventing shrinkage of the component onto the male mould are to reduce the size of the male mould, i.e. to use a male mould of flexible dimension, or to use an anti-friction layer or release layer between male mould and component for the forming process. Examples of a preferred material for this purpose would be Teflon or similar materials.

It is particularly preferable that the retraction of the male mould and/or the separation of the tooling takes place at a temperature below or equal to the Vicat softening point of the polymer. This can provide the best possible way of ensuring the dimensional stability of the component obtained from the forming process.

It is preferable that the shaping male mould and the part obtained from the forming process are separated as soon as the component obtained from the forming process can no longer undergo spontaneous shape-reversion. Ideally, this takes place in the temperature range from 80 to 90° C. It is preferably followed by a conditioning phase at from 70 to 90° C., preferably from 75 to 85° C., particularly preferably 80° C. This permits elimination of stress during conditioning of the component.

During cooling after the forming process has ended, particular care has to be taken to achieve maximum uniformity of internal and external temperature of the preform until cooling has ended, in order to avoid any thermal stresses. The internal temperature (in the central plane) and the external temperature (at the exterior surface) should preferably vary by at most from 20 to 35° C., particularly preferably by at most from 5 to 20° C. Care should also, of course, be taken to avoid any inhomogeneity of the temperatures at the surface or in the interior of the preform or of the part obtained from the forming process. The non-aggressive forming process in the process described is the only way of ensuring that the properties of the material used are not impaired.

Figure 3:
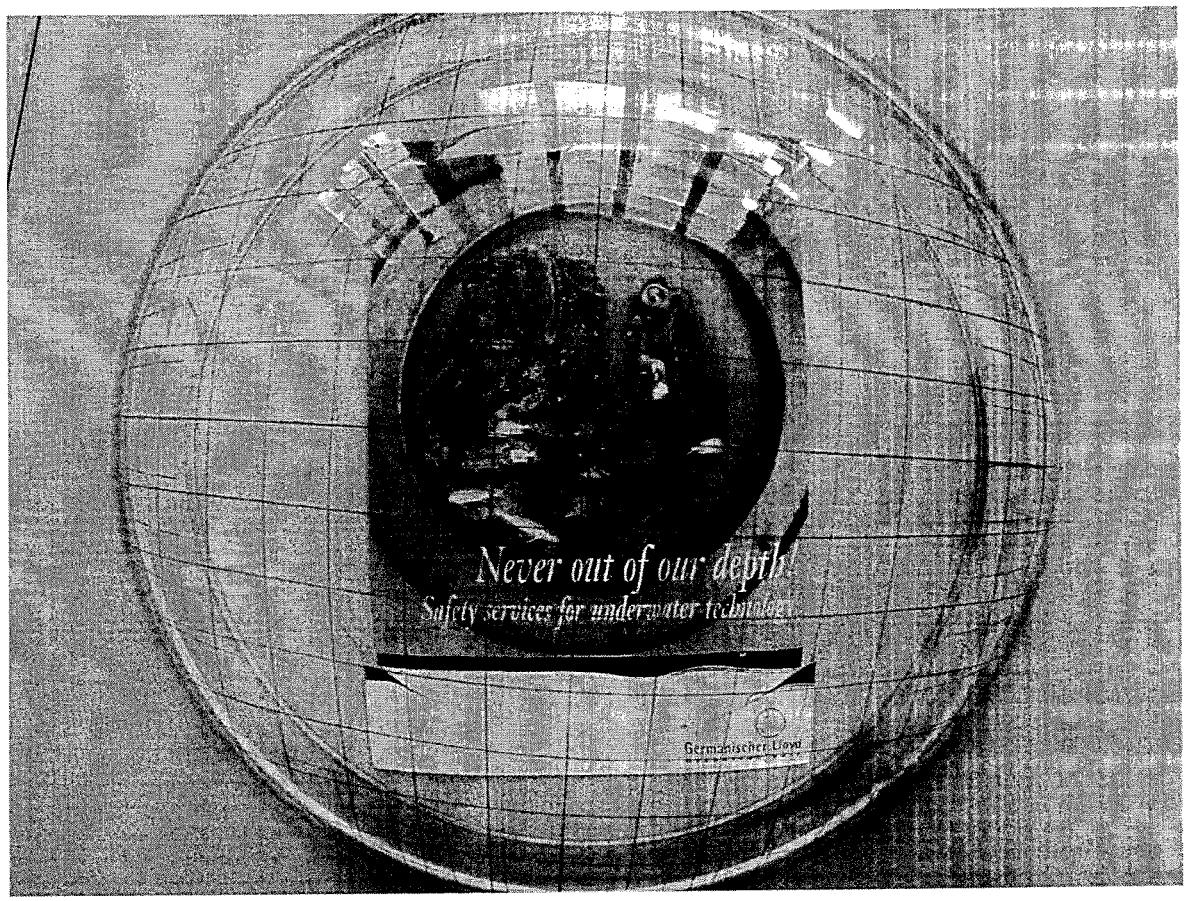
FIG. 3 is a photograph of a biaxially curved component produced from a preform according to an embodiment.

As can be seen in FIG. 3, the component according to the invention already has very good optical quality after cooling—without further surface-finishing steps. In FIG. 3, a preform on which a grid structure has been drawn was used, so as to allow testing of the uniformity of the forming process. As can be seen, the forming process is very uniform.

In the process according to the invention it is naturally possible, in one or more steps downstream of the step d), to subject the component obtained form the forming process to an internal and/or external mechanical finishing process, in particular milling and/or grinding and/or polishing, in such a way that components with excellent optical properties can be obtained.

A feature of the apparatus that can preferably be used in the process according to the invention is that the preform is moved from below against a fixedly mounted male mould, or that a male mould is forced from above into a preform, and that the size of the gap between male mould at its widest dimension and female mould is in the range from 0.7 to 1.5, preferably from 0.8 to 1.5, particularly preferably from 0.9 to 1.2, and very particularly preferably from 1.0 to 1.1, times the thickness of the preform sheet used.

In a first preferred embodiment of the process according to the invention, in which it is preferable to produce components with small aperture angles, particularly preferably from 90 to 120°, the widest point of the male mould is not moved into the female mould. Lower gap thicknesses are therefore sufficient here, extending to 1.0. The size of the gap here is preferably from 0.7 to 1.5, particularly preferably from 0.9 to 1.2, and very particularly preferably from 1 to 1.1, times the thickness of the preform sheet used.

In a second preferred embodiment, which preferably produces components with large aperture angle, particularly preferably greater than 120°, the male mould is moved further into the female mould, generally sufficiently far that its widest point enters the female mould, in such a way that the size of the gap here is generally greater than in the first preferred embodiment. The size of the gap in this embodiment is preferably greater than 1 to 1.5 here, particularly preferably from 1.01 to 1.4, very particularly preferably from 1.02 to 1.3, specifically preferably from 1.04 to 1.2, very specifically preferably from 1.05 to 1.2 and with particular preference from 1.05 to 1.1, times the thickness of the preform sheet used.

The inventors have found that, alongside the shaping of the preform and the process conditions discussed above for steps a) to d), a defined size of the gap can also contribute to an improvement in component properties.

A size of the gap in the abovementioned ranges provides homogeneous mould contact and can prevent production of an excessively large bead at the entry into the female mould. If the said bead becomes too large, the pressure that must be exerted can be too high, with resultant stretching (similar to fixing of the preform) and compression. This in turn impairs the mechanical properties of the components according to the invention. A particularly preferred feature of the apparatus according to the invention and of the process according to the invention is therefore that the size of the gap is within the abovementioned ranges.

The female mould used in the apparatus according to the invention can comprise an open or closed countermould. The female mould can have been designed so that it can be divided in order to facilitate the release of complicated components. A divided female mould in which the individual sections can be moved with respect to one another moreover provides the possibility of appropriate adaptation of the size of gap during the forming process, in order to ensure ideal shaping.

The apparatus can moreover comprise reduced-pressure equipment, preferably a vacuum bag or reduced-pressure chamber, below the female mould, in order to achieve a still further reduction of the pressure required from the male mould. The subatmospheric pressure here must be adjustable in such a way that the abovementioned speeds can be maintained for the forming process. It must therefore be possible to increase the pressure during the forming process in accordance with the force that is used during the forming process and that rises until the forming process ends. To this end, increase rates for the subatmospheric pressure are preferably in each case from 0.01 to 0.9 bar/h, particularly preferably from 0.05 to 0.5 bar/h and very particularly preferably from 0.1 to 0.4 bar/h.

In one particularly preferred embodiment of the present invention, the shaping parts, in particular male mould and female mould, have been designed moveably in such a way that their position can be altered during the forming process. It is thus possible to produce specific geometries of the components obtained from the forming process. The movement can be achieved by means of manual operation or automatically, e.g. by means of actuating motors, etc. Appropriate technical solutions are well known and can easily be modified appropriately by a person skilled in the art.

As previously mentioned, ability to control process temperature is an important property of the apparatus according to the invention. To this end, this can preferably have been arranged in a temperature-controllable housing, particularly preferably an oven, and/or can have been equipped with temperature-controllable tooling. In the case of the tooling, the temperatures to which the moulds and contact surfaces are controlled can be identical or different. The apparatus according to the invention can comprise not only temperature-controllable tooling for shaping purposes but also equipment serving purely for heating or cooling.

A general rule is that the apparatus according to the invention can comprise not only heating equipment but also cooling equipment, in order to permit ideal control of both the heating process and the cooling process.

The present invention also comprises non-planar components made of a polymer material which preferably comprises polymethyl methacrylate, which are characterized in that they have a thickness of from 30 to 300 mm, preferably from 30 to 250 mm, particularly preferably from 50 to 200 mm, the wall thickness at the thickest point of the component is at most 50% greater than at the thinnest point, and in that, when the component is heated to temperatures of from 120 to 170° C., it reverts by relaxation partially or completely to the shape of the preform.

The components according to the invention differ substantially from the prior-art components produced by means of high-pressure cast polymerization, which do not revert by relaxation on appropriate heating.

The thermal relaxation property resulting from the process according to the invention can be utilized advantageously inter alia in the recycling of the components according to the invention. However, there are also conceivable specific applications in which it is desirable that the preform undergoes a forming process to give its original shape at particular temperatures, e.g. for safety reasons.

The components according to the invention can have many different types of symmetrical or else asymmetrical shapes, in particular hollow shapes. It is preferable that a spherical segment is involved, in particular a hemisphere, or a straight or curved tube segment or a similar component having other hollow shapes, e.g. bowls, cups or bath tubs, etc.

A feature of the geometries of glazing demanded by the market is a small ratio of radius in the forming process to thickness of the material. This actually means extreme stress in compression and in stretching. In the case of spherical segments, the aperture angle is preferably in the range from 90 to 180° and particularly preferably in the range from 120 to 180°, and/or the ratio of internal radius to wall thickness is in the range from 2 to 50, particularly preferably in the range from 3 to 20. The process according to the invention can produce appropriately demanding geometries. It is therefore also possible by way of example to produce components which have an aperture angle of 180° and where the part obtained from the forming process then also has a cylindrical continuation.

The components according to the invention are substantially or completely stress-free—as can be demonstrated by testing of the material—and none of the properties of the material have undergone any significant adverse alteration in comparison with the starting material.

When a preform undergoes the forming process according to the invention, overstretching in respect of the thickness of the material is minimized. That is one of the decisive differences from the processes commonly used hitherto. It is thus possible to gain access to new fields of application. Windows for submarines (spherical-segment windows or hemispherical windows) are a preferred application, as also are other components such as curved water-slide elements or glazing in extreme environments, e.g. for underwater hotels, or components for public aquaria, or artwork projects or construction projects.

The examples below serve to illustrate, and increase understanding of, the present invention, but in no way restrict the same.

EXAMPLE 1

Figure 4:
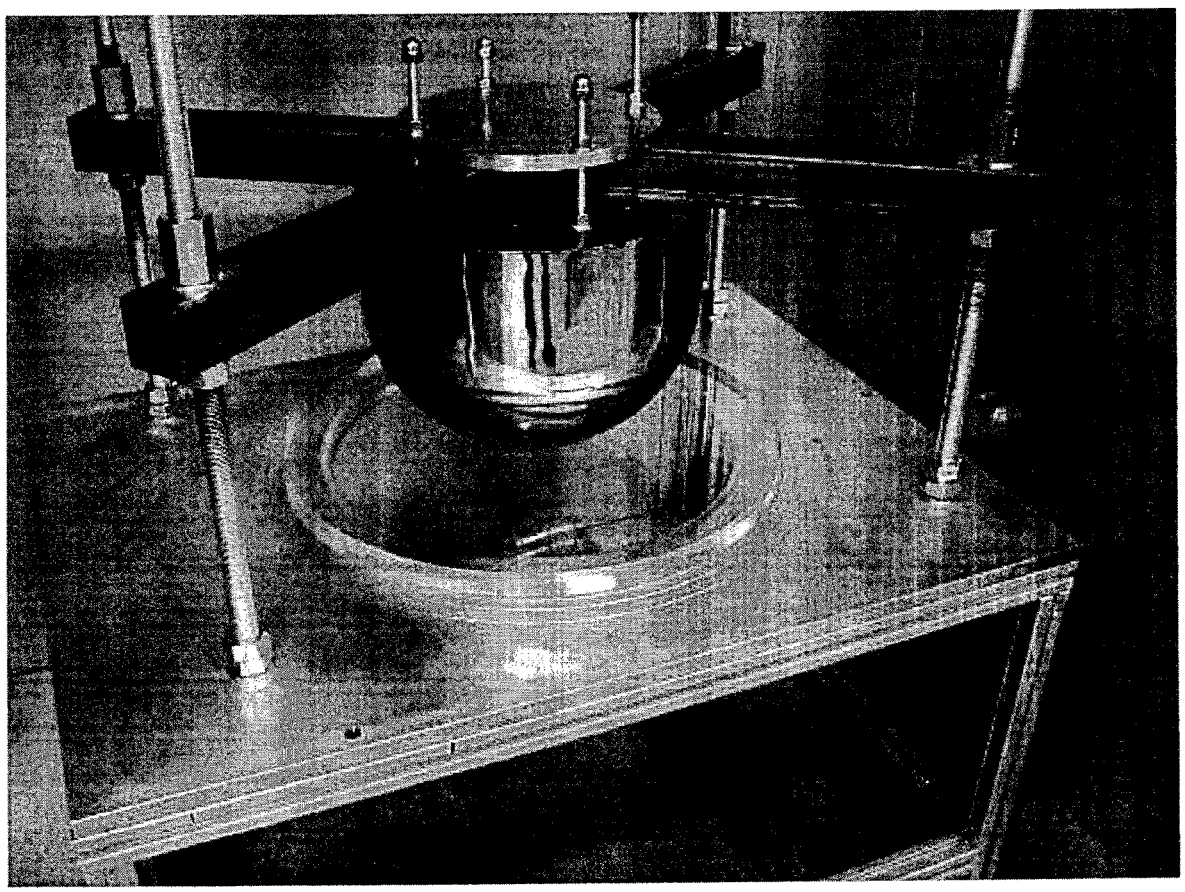
FIG. 4 is a photograph of an apparatus used to produce the hemispherical component of Example 1.

A hemispherical component was produced in a laboratory apparatus according to FIG. 4 from a preform of thickness 40 mm. The internal radius of the component is 180 mm, and the internal radius/thickness ratio in the forming process is therefore 4.5. The apparatus according to FIG. 4 was constructed in a conditioning cabinet, and the temperature of the preform prior to the forming process, and also the process temperature, was adjusted to 150° C. The size of the gap was 43 mm.

FIG. 3 is a picture of the component—obtained directly after the forming process and subjected to no further mechanical operations. Optical quality is already seen to be excellent.

Figure 5:
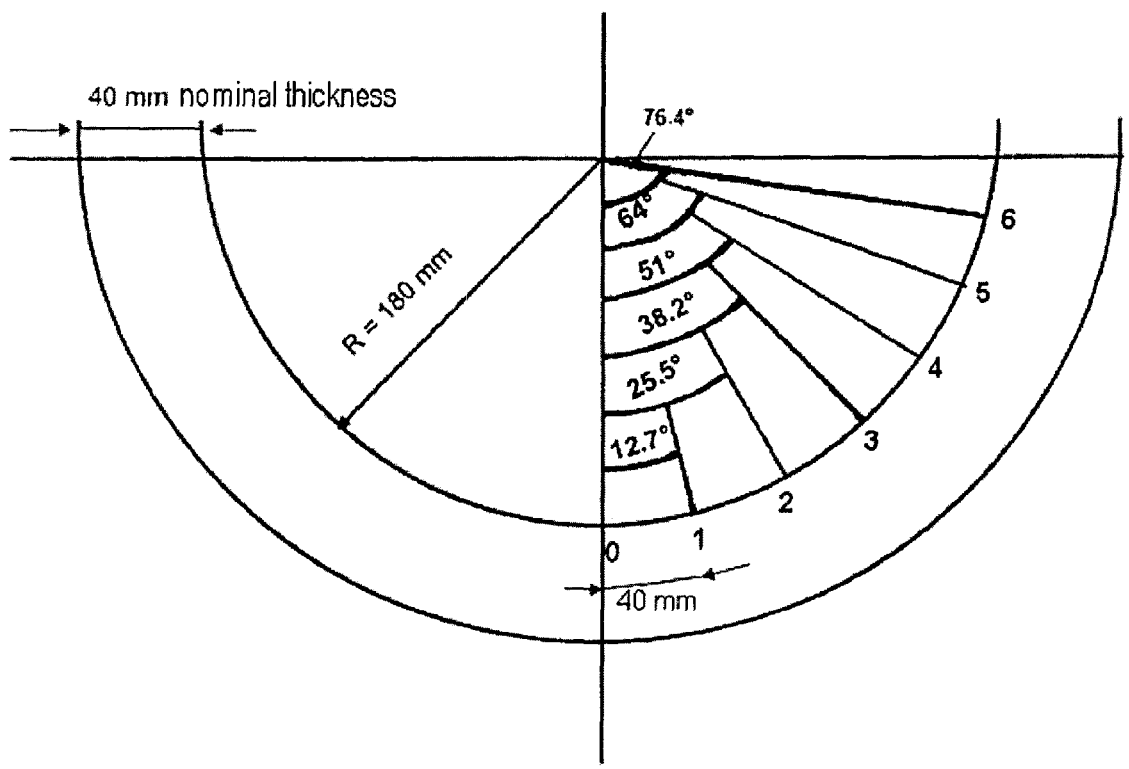
FIG. 5 is a schematic illustration of points for measuring thickness in a hemispherical component of an embodiment.
Figure 6:
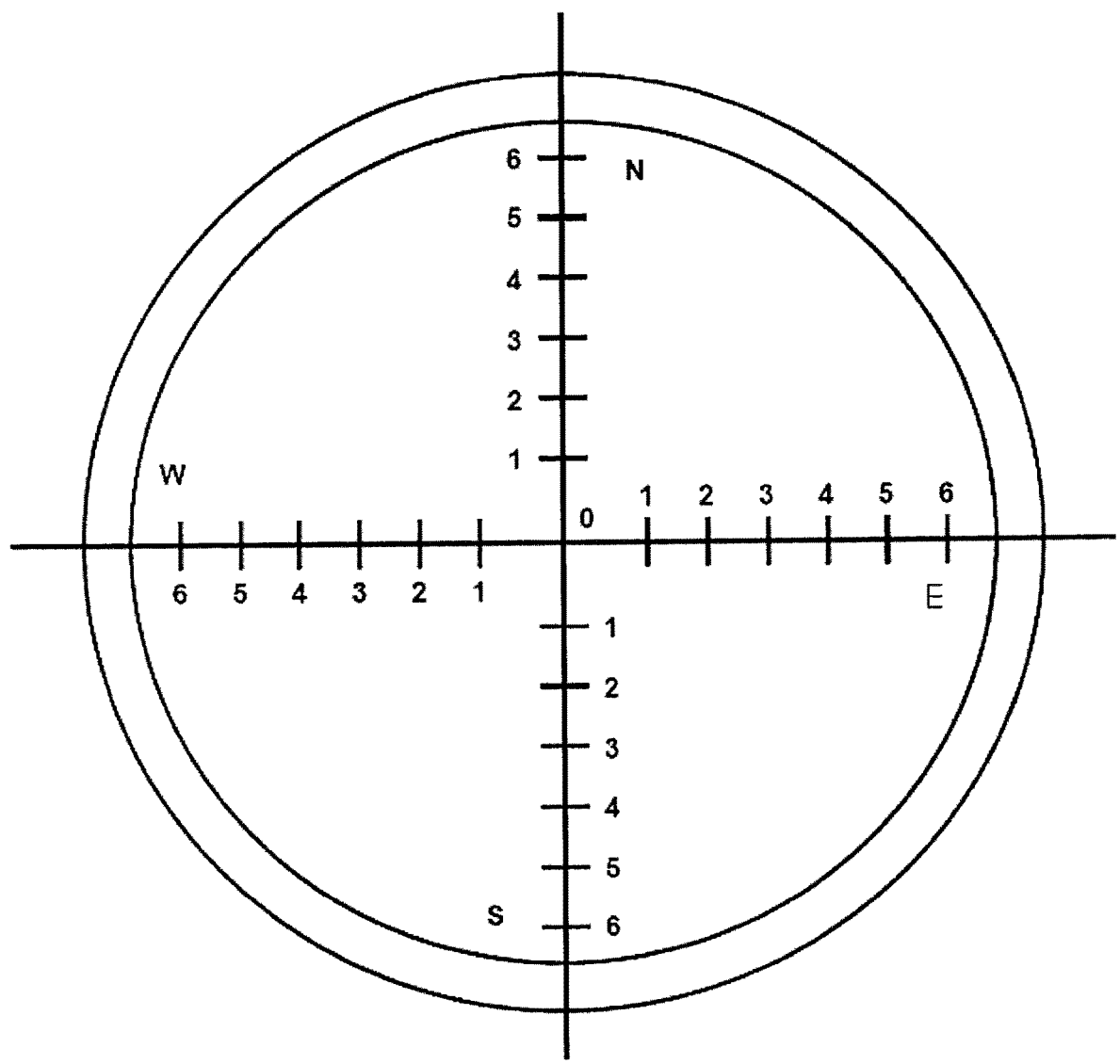
FIG. 6 is a schematic illustration of points for measuring thickness in a hemispherical component of an embodiment.

For thickness monitoring, a plurality of measurement points were defined according to FIGS. 5 and 6 and the thickness was determined at the respective measurement points by means of ultrasound thickness-measurement equipment. Table 1 below gives the results.

TABLE 1

|   | 0 | 1 | 2 | 3 | 4 | 5 | 6 |
|---|---|---|---|---|---|---|---|
| S | 35.8 | 36.1 | 36.2 | 36.9 | 38.4 | 40.9 | 43.6 |
| E |  | 36.3 | 36.7 | 37.7 | 39.5 | 40.7 | 44.2 |
| N |  | 36.2 | 36.6 | 37.3 | 38.7 | 41.3 | 44.1 |
| W |  | 36.1 | 36.4 | 37 | 38.5 | 40.5 | 43 |

The differences from the initial thickness of the preform are seen to be in the range of ±10%. In comparison with prior-art forming processes in which the initial thickness of the material is reduced by about 70%, this represents a significant improvement, and provides evidence of the small extent of stretching/compression already achieved in this laboratory experiment. It is moreover clear that the extent of finishing processes required is only small.

Geometries with large internal radius/thickness ratio require less severe forming than those with a small ratio, and this practical demonstration therefore also provides evidence of the usefulness of the process for greater thicknesses.

EXAMPLE 2

A preform of thickness 170 mm was subjected to a forming process in an enlarged apparatus similar to FIG. 4 to give a hemispherical submarine window. The finished submarine window has a thickness of 140 mm and an internal radius of 595 mm.

The thickness variation—measured as in Example 1—in the preform after the forming process—prior to mechanical finishing processes—was from −25 to +15 mm (corresponding to from +9 to −15%).

Figure 7:
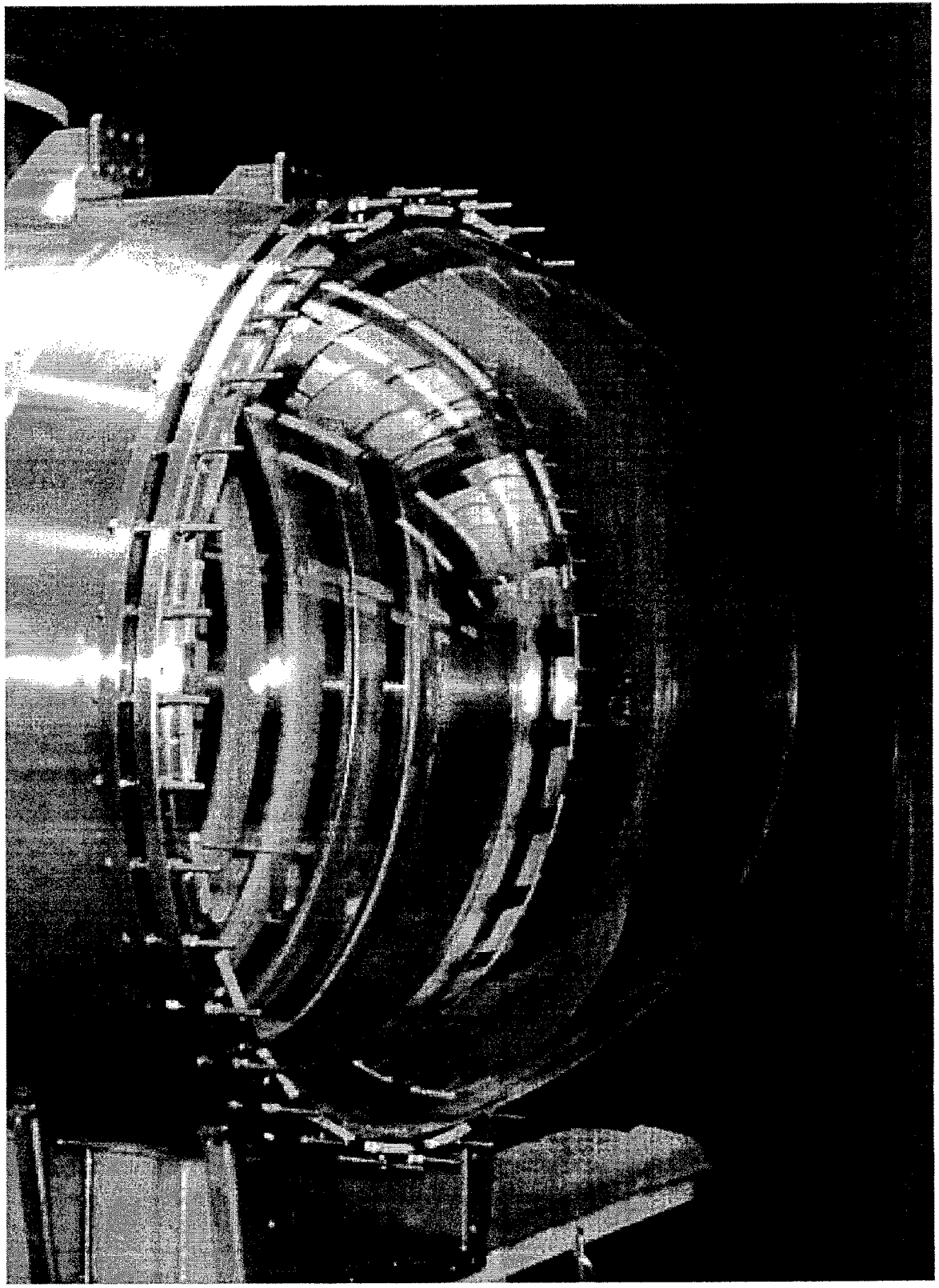
FIG. 7 is a photograph of a biaxially curved component produced in Example 2.

The final window was obtained from the preform through mechanical finishing processes: milling/polishing/grinding. The window complies with all of the conditions for approval for pressure loadings up to 100 bar, i.e. immersion depths up to 1000 m. Compliance with all of the requirements placed upon optical properties is likewise achieved (see FIG. 7).

This example provides evidence that the process according to the invention can produce components obtained from the forming process with excellent optical and mechanical properties, from preforms only slightly thicker than the target thickness of the component obtained from the forming process. The amount of material lost during mechanical finishing processes is therefore only small, in particular in comparison with the processes used as standard hitherto and involving high-pressure polymerization with mechanical finishing processes. It can moreover be concluded from the results of this experiment that the same target component could also be obtained with preforms of thickness from 140 to 170 mm in the process according to the invention. A preform of thickness 170 mm was selected merely because a preform of this type was available commercially.

EXAMPLE 3

A preform made of Plexiglas® GS of thickness 60 mm was subjected to a forming process together with a sacrificial sheet underlay of thickness 10 mm in an apparatus according to FIG. 4 to give a hemispherical submarine window. The finished submarine window has a thickness of 45 mm and an internal radius of 358 mm.

The thickness variation—measured as in Example 1—in the part made of preform and sacrificial sheet after the forming process—prior to mechanical finishing processes— was from −7 to +12 mm (corresponding to from +17 to −10%). The area A in the central plane of the preform was 0.76 m$^2$, and the area Av in the central plane of the preform after the forming process was 0.85 m$^2$, and the enlargement recorded through the forming process was therefore only 12%.

The sacrificial sheet was entirely removed from the part by milling, and the final window was then obtained from the preform after the forming process through mechanical finishing processes: milling/polishing/grinding.

In this example, a deformation grid was milled into the sacrificial sheet and permitted subsequent monitoring of the forming process. This is not possible without a sacrificial sheet, since otherwise the pattern would have to be milled into the preform. In the present example, the sacrificial sheet led to an improvement in the dimensional accuracy of the internal shape. The sacrificial sheet removed by milling was recycled.

EXAMPLE 4

A preform of thickness 60 mm was subjected to a forming process in an enlaraged apparatus according to FIG. 4 to give a hemispherical component with cylindrical continuation. In other words, the aperture angle is 180°, extended by the cylindrical continuation, and this corresponds to an extreme forming process.

The thickness variation—measured as in Example 1—in the preform after the forming process—prior to mechanical finishing processes—was from −8 to +5 mm (corresponding to from +8 to −9%). The area A in the central plane of the preform was 0.46 m$^2$, and the area Av in the central plane of the preform after the forming process was 0.424 m$^2$, and the decrease in size recorded through the forming process was therefore only 7.8%, and this in turn provides evidence that the process according to the invention can save material and therefore has high efficiency.

The invention claimed is:

1. A process for producing a biaxially curved component, the process comprising:
   a) producing a preform of thickness from 30 to 400 mm from a polymer material, wherein an area A in a central plane of the preform is equal to an area Av in a central plane of the component with a variance of ±40%,
   b) introducing the preform into an apparatus so that the preform is freely moveable at edges of the apparatus during the process, and optionally the preform is placed on a female mould,
   c) heating the preform to a temperature of from 120 to 170° C., and
   d) using a male mould to carry out a forming process on the preform, thereby obtaining the component.

2. The process according to claim 1, wherein a gap between the male mould at the widest dimension and the female mould is from 0.7 to 1.5 times of the thickness of the preform.

3. The process according to claim 1, wherein at least one following condition is satisfied:
   the preform is moved from below against a fixedly mounted male mould, or the male mould is forced from above into the preform,
   the female mould comprises an open or a closed countermould,
   an aid to the process is used, optionally a lubricant is applied to at least one of the female mould and the male mould,
   an apparatus with reduced-pressure equipment is used,
   an apparatus is used in which shaping parts have been designed moveably so that position of the shaping parts are alterable during the process,
   an aid apparatus is used by which the preform is forced during the process against the male mould or into a gap formed by the female mould,
   and
   an apparatus is used in which individual sections of a divided female mould are movable with respect to one another so that gap formed by the female mould is adapted appropriately for ideal shaping.

4. The process according to claim 1, wherein at least one following condition is satisfied:
   a temperature of the preform in the central plane is held constant during the entire process with a variance of up to ±5%,
   a preheated preform is introduced into the apparatus,
   the entire process takes place in an apparatus with a temperature-controllable housing, a temperature-controllable tooling, or both, where temperatures of the moulds and contact surfaces are controlled to be either identical or different,
   and
   after the process, the component remains in the mould and is cooled with the mould.

5. The process according to claim 1, wherein the process is carried out without a holding phase, or the process is carried out with one or more holding phases.

6. The process according to claim 1, wherein the component is subjected to at least one of an internal and an external mechanical finishing process.

7. The process according to claim 1, wherein at least one following condition is satisfied:
the preform is a preform composed of a single-layer slab or a plurality of layers bonded to one another,
a ratio of a thickness of the preform at the thinnest point to a thickness of the component at the thinnest point is of from 1.0 to 2.0,
the thickness of the preform is from 30 to 300 mm, and
one or more sacrificial sheets are placed on, under, or both on and under the preform and are subjected together with the preform to the process.

8. The process according to claim 1, wherein the polymer material comprises polymethyl methacrylate.

9. The process according to claim 8, wherein at least one following condition is satisfied:
the preform is moved from below against a fixedly mounted male mould, or the male mould is forced from above into the preform,
the female mould comprises an open or a closed countermould,
an aid to the process is used, optionally a lubricant is applied to at least one of the female mould and the male mould,
an apparatus with reduced-pressure equipment is used,
an apparatus is used in which shaping parts have been designed moveably so that position of the shaping parts are alterable during the process,
an aid apparatus is used by which the preform is forced during the process against the male mould or into a gap formed by the female mould,
and
an apparatus is used in which individual sections of a divided female mould are movable with respect to one another so that gap formed by the female mould is adapted appropriately for ideal shaping.

10. The process according to claim 8, wherein at least one following condition is satisfied:
a temperature of the preform in the central plane is held constant during the entire process with a variance of up to ±5%,
a preheated preform is introduced into the apparatus,
the entire process takes place in an apparatus with a temperature-controllable housing, a temperature-controllable tooling, or both, where temperatures of the moulds and contact surfaces are controlled to be either identical or different,
and
after the process, the component remains in the mould and is cooled with the mould.

11. The process according to claim 8, wherein the component is subjected to at least one of an internal and an external mechanical finishing process.

12. The process according to claim 8, wherein at least one following condition is satisfied:
the preform is a preform composed of a single-layer slab or a plurality of layers bonded to one another,
a ratio of a thickness of the preform at the thinnest point to a thickness of the component at the thinnest point is of from 1.0 to 2.0,
the thickness of the preform is from 30 to 300 mm, and
one or more sacrificial sheets are placed on, under, or both on and under the preform and are subjected together with the preform to the process.

* * * * *